United States Patent
Mueller et al.

(10) Patent No.: US 11,110,870 B2
(45) Date of Patent: Sep. 7, 2021

(54) KNIT SPACER FABRIC FOR USE AS INTERIOR VEHICLE TRIM

(71) Applicants: Stefan Mueller, Wiehl (DE); Frank Mueller, Wiehl (DE)

(72) Inventors: Stefan Mueller, Wiehl (DE); Frank Mueller, Wiehl (DE)

(73) Assignee: MUELLER TEXTIL GMBH, Wiehl-Drabenderhoehe (DE)

( * ) Notice: Subject to any disclaimer, the term of this patent is extended or adjusted under 35 U.S.C. 154(b) by 307 days.

(21) Appl. No.: 16/425,500

(22) Filed: May 29, 2019

(65) Prior Publication Data

US 2019/0381955 A1     Dec. 19, 2019

(30) Foreign Application Priority Data

Jun. 18, 2018   (DE) .......................... 102018114566.7

(51) Int. Cl.
| | | |
|---|---|---|
| *B60R 13/02* | (2006.01) | |
| *B32B 5/02* | (2006.01) | |
| *B32B 5/06* | (2006.01) | |

(52) U.S. Cl.
CPC .............. *B60R 13/02* (2013.01); *B32B 5/026* (2013.01); *B32B 5/06* (2013.01); *B32B 2605/003* (2013.01)

(58) Field of Classification Search
CPC ........... B60R 13/02; B32B 5/026; B32B 5/06; B32B 2605/003
USPC .................. 296/1.08, 39.1, 39.3, 900, 901.01
See application file for complete search history.

(56) References Cited

U.S. PATENT DOCUMENTS

| | | | | |
|---|---|---|---|---|
| 6,231,940 B1 * | 5/2001 | Aichner | .................... | B32B 9/00 428/332 |
| 6,306,483 B1 * | 10/2001 | Bessey | .................. | B29C 51/004 428/175 |
| 6,755,052 B1 * | 6/2004 | Sytz | ......................... | D04B 1/18 66/19 |
| 7,418,837 B2 * | 9/2008 | Muller | ................... | D04B 27/34 66/195 |
| 8,286,451 B2 * | 10/2012 | Mueller | ................ | D04B 21/16 66/195 |
| 8,820,815 B2 * | 9/2014 | Krenz | ................. | H01M 10/613 296/65.01 |
| 2004/0097151 A1 * | 5/2004 | McMurray | ............. | D04B 1/246 442/304 |
| 2005/0238842 A1 * | 10/2005 | Schindzielorz | ........ | D04B 21/16 428/86 |
| 2013/0057035 A1 * | 3/2013 | Nishiura | ............... | B60N 2/7011 297/218.3 |
| 2016/0263857 A1 * | 9/2016 | Mueller | ................. | D04B 1/102 |
| 2018/0187348 A1 | 7/2018 | Mueller | | |
| 2020/0385906 A1 * | 12/2020 | Ponsolle | .................. | D02G 3/46 |

\* cited by examiner

*Primary Examiner* — D Glenn Dayoan
*Assistant Examiner* — E Turner Hicks
(74) *Attorney, Agent, or Firm* — Andrew Wilford

(57) ABSTRACT

A spacer fabric comprises a first and a second textile layer as well as spacer yarns that join the textile layers and is used to form an interior trim. The first textile layer is visible from outside on a surface of the interior trim, and the first textile layer and the spacer yarns are made entirely of polymeric multifilament yarns. At least the polymeric multifilament yarns of the first textile layer and of the spacer yarns are dyed.

14 Claims, 1 Drawing Sheet

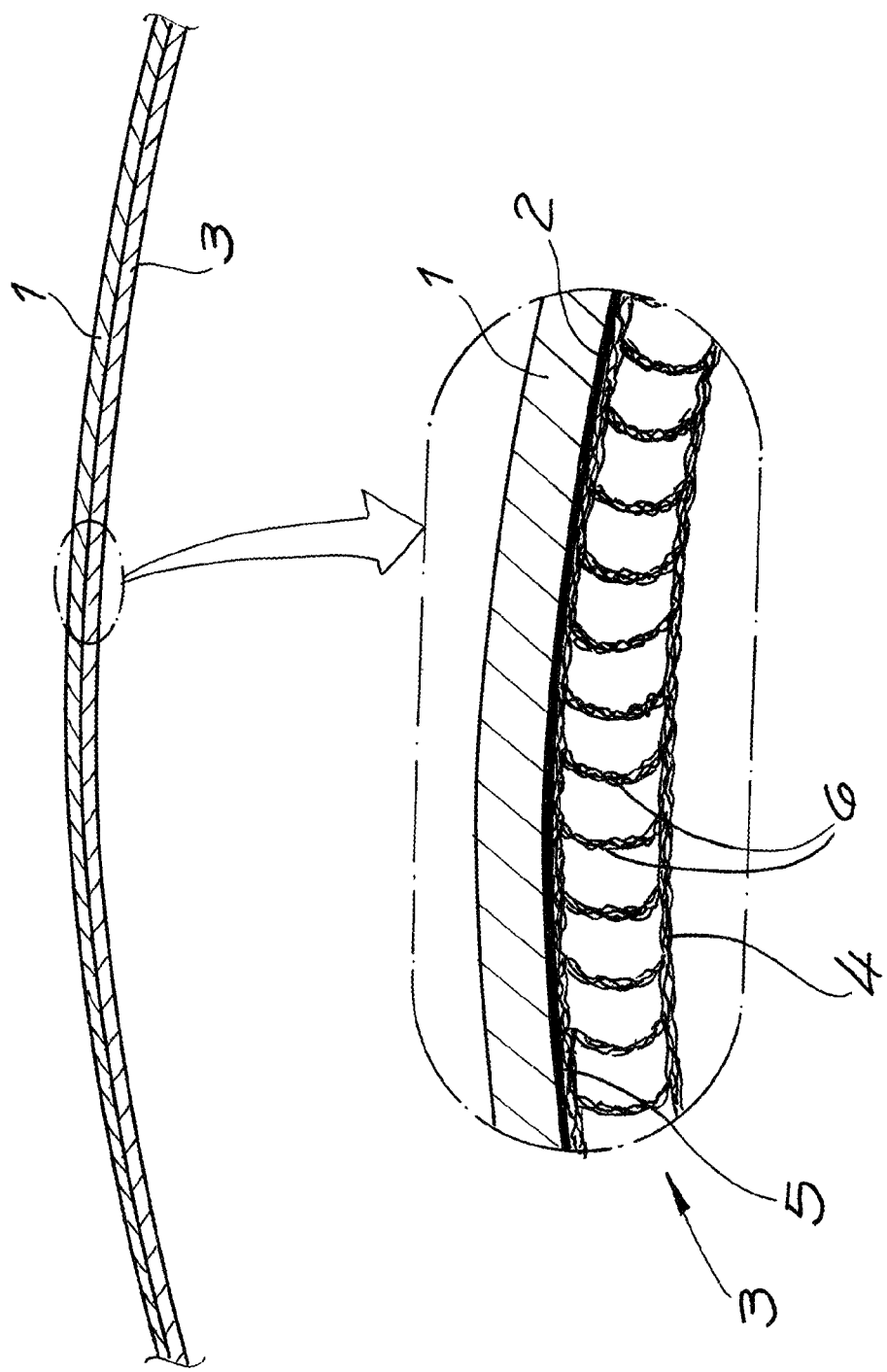

KNIT SPACER FABRIC FOR USE AS INTERIOR VEHICLE TRIM

FIELD OF THE INVENTION

The present invention relates to a spacer fabric. More particularly this invention concerns the use of such a spacer fabric on a vehicle interior trim and to the actual trim part.

BACKGROUND OF THE INVENTION

Spacer fabrics and, in particular, knitted spacer fabrics are characterized by a light, air-permeable structure that is elastic in the direction of their thickness as a result of spacer yarns that run between the two flat textile layers.

By virtue of these properties, spacer fabrics can be used as soft, elastic layers that enable air circulation, for example in mattresses, upholstered furniture, garments, or shoes. Moreover, spacer fabrics are widely used as technical textiles in the automotive sector as well, being employed as an elastic intermediate layer in climate-controlled seats, seat covers, or interior trim parts.

A knitted spacer fabric as an intermediate layer for interior trim of a motor vehicle is known from U.S. Pat. No. 8,286,451 in which a reduced tensile strength is provided in a plurality of locations specifically for the purpose of using the knitted spacer fabric over an airbag, more particularly an airbag flap.

According to US 2018/0187348, the knitted spacer fabric serves for forming a composite material for the interior of a motor vehicle. A cover and decorative layer made of a material selected from among the group that includes leather, synthetic leather, decorative film, and textile is carried on the knitted spacer fabric. In an especially advantageous manner, the knitted spacer fabric elastically supports the cover and decorative layer, it being possible for the composite material to be applied even to an uneven substructure precisely due to the elastic properties of the knitted spacer fabric.

While spacer fabrics often serve elastic intermediate layer in an interior trim, an embodiment of a knitted spacer fabric is proposed according to US 2016/0263857 that can be used without an additional cover layer and thus forms a surface of an interior trim part or of a seat cover. In order to achieve high robustness, the spacer yarns form stitches in a first knitted layer through yarn interlacing, while the spacer yarns do not form any stitches in a second flat knitted layer, being incorporated there merely as weft. In addition, an array of holes of the second knitted layer can be provided that are then advantageously covered by weft yarns on the inner face of the second knitted layer.

Both in the case of the spacer fabrics provided as an intermediate layer and of the knitted spacer fabric according to US 2016/0263857, the spacer yarns are usually formed by monofilaments. Even though multifilament yarns are not excluded categorically as spacer yarns, monofilament yarns are used entirely in practice due to their greater strength and compression hardness.

By virtue of the preferred structure of the second flat knitted layer with a knitting pattern having holes and weft yarns arranged therein (see FIG. 5 in particular), an especially lively and appealing appearance is achieved. The holes result in a visually loose surface that enhances the impression of a breathable structure. At the same time, the second knitted layer is relatively opaque and closed due to the separate weft yarns.

The material known from US 2016/0263857 is not suitable for an unobtrusive, restrained design.

In designing the interior of a motor vehicle, great importance is placed on the configuration and selection of surfaces and materials. Areas near the dashboard or also on the interior trim of the doors should often attract the attention an observer's attention and appeal to their aesthetic sensibility. Other surfaces, such as the headliner, on the other hand, are designed to be more reserved and quiet.

In known constructions of a headliner, a multilayer laminate is provided in which a textile cover layer of fabric is laminated over an intermediate layer of foam on a substrate, particularly a substrate that is formed from a laminate by thermoshaping. Although such a construction is well established in practice, it entails certain disadvantages. For example, foams can release emissions that are clearly perceptible, particularly in a new car. This is especially true if the foam is flame-laminated with the substrate and/or the fabric as a textile cover layer, in which case substantial emissions are released even during the manufacturing process.

Even if the laminate is made merely by adhesive, it is necessary to arrange the adhesive both between the substrate and the foam on the one hand and between the foam and the textile cover layer on the other hand.

Furthermore, the known structure with a substrate, an intermediate layer of foam, and the cover layer of fabric is also problematic in terms of recycling, because different materials are used that cannot be separated from one another, or at least not easily. For example, if the fabric is being torn from the substrate during recycling, then layer separation will typically occur within the foam, resulting in contamination of both the substrate and the fabric by the foam residue.

Finally, the durability of foam is in need of improvement. For example, it is known that, especially in old motor vehicles such as classic cars, intermediate layers of foam lose their original structure and, in the worst case, crumble.

OBJECTS OF THE INVENTION

Against this background, it is the object of the present invention to provide an improved interior trim part as well as a use of a spacer fabric to form an interior trim part and a knitted spacer fabric that is especially suitable for this purpose is to also be specified.

SUMMARY OF THE INVENTION

Use of a spacer fabric that comprises a first and a second textile layer as well as spacer yarns that join the textile layers to form an interior trim, wherein the first textile layer is visible from outside on a surface of the interior trim, the first textile layer and the spacer yarns are made entirely of polymeric multifilament yarns, and at least the polymeric multifilament yarns of the first textile layer and of the spacer yarns are dyed.

In the context of the use according to the invention, the spacer fabric that is preferably a knitted spacer fabric, forms a visible surface of the interior trim, and provides soft and to some extent elastic support for the first textile layer through the spacer yarns.

In this context, the present invention is based on the insight that conventional spacer fabrics are only partially suitable for forming an especially uniform and harmonious surface of an interior trim. Even in the case of a very dense configuration of the first textile layer, the spacer yarns are still partly visible due to the usual stitch formation in which the spacer yarns are in fact entwined with the yarns of the first textile layer during stitch formation and thus also partially overlie the yarns of the first textile layer.

While visual appearance does not play any essential role when a spacer fabric is used as an intermediate layer, surfaces of an interior trim, particularly of the interior trim of a vehicle such as a passenger car, are designed in an exactly predetermined manner in terms of color. Even if monofilament yarns, as spacer yarns, and multifilament yarns of the first textile layer are dyed in the same manner in a conventional knitted spacer fabric, a different color impression is produced due to the different structure. An objectionable, uneven pattern can be produced precisely due to the only partially visible spacer yarns. Due to the textile manufacturing process and/or slight random or systematic variations during production, objectionable patterns and appearances can even occur like a Moiré effect during manufacturing.

Given this, in the context of the use according to the invention the first textile layer and the spacer yarns are made entirely of polymeric multifilament yarns, with the multifilament yarns of the first textile layer and of the spacer yarns being dyed in a desired manner.

Then, only the multifilament yarns of the first textile layer and individual portions (loops) of the spacer yarns that are also made of multifilament yarn, are visible on the surface. Only then can a textile structure that is highly uniform and homogeneous visually as well be ensured like in a conventional, two-dimensional textile.

With regard to the mechanical properties of the spacer fabric, disadvantages such as a lower compression hardness and elasticity compared to a spacer yarn in the form of a spacer fabric containing monofilament yarn are deliberately accepted in this connection. The mechanical properties happen to be sufficient, however, for interior trim parts that are subjected to no or little stress, such as the headliner of a passenger car. In particular, a compression hardness and a restorative behavior that is similar to that of known materials with a layer of cut foam that are intended for use in the formation of a headliner can be achieved. The spacer fabric according to the invention turns out to be especially advantageous with regard to such an application. In the context of the invention, there is also the advantage that, when used as interior trim, the spacer fabric can also be recycled in an especially simple and complete manner. This applies both to final disposal of the finished product as well as to waste and offcuts of the spacer fabric.

The spacer fabric that is preferably knitted typically has a thickness of between 1.5 mm and 10 mm, particularly between 2 mm and 5 mm, for example approximately 3.5 mm.

Additional especially preferred embodiments can be provided in order to further support the especially uniform appearance of the spacer fabric.

The entire spacer fabric can thus be made entirely of multifilament yarns. It is even possible to form the spacer fabric from a single yarn type for the multifilament yarns. Therefore, all the multifilament yarns have the same structure and, in particular, the same fineness, within manufacturing tolerances, in the context of such an embodiment. If one then considers only a single multifilament yarn on its own, then it can no longer be associated with both textile layers or the spacer yarns. The material is then completely uniform with respect to the multifilament yarn used, so it is also not necessary to procure different multifilament yarns for the two flat textile layers and the spacer yarns.

The multifilament yarns of the first textile layer and of the spacer yarns and, preferably, of the second textile layer as well typically have a fineness of between 50 and 167 dtex.

The multifilament yarns of the first knitted layer and of the spacer yarns and, preferably, of the second knitted layer as well preferably have between 12 and 50 filaments. Suitable multifilament yarns can have 24 or 36 filaments, for example. While the material becomes even softer with an increasing number of filaments, as the number of filaments decreases, the compression hardness and the resistance of the multifilament yarn to mechanical stress increase.

In order to achieve an especially appealing and preferably uniform color impression in the textile structure of the textile layers and of the spacer yarns, at least the multifilament yarns of the first textile layer and of the spacer yarns and, preferably, of the second textile layer as well are dyed not only with the same color but also in the same manner. An embodiment in which the multifilament yarns are spun-dyed is especially preferred.

In the case of spun-dyed multifilament yarns, the dye is added directly to the polymer composition in the form of a master batch spun into the individual filaments. The individual filaments are then dyed through completely and uniformly. Even in the event of mechanical damage, abrasion, or the like, the surface texture can change, if anything, but not the color tone. Spun-dyed materials are thus also especially colorfast in the long term, with the dyes in the polymer matrix also being well protected against environmental influences such as for example bleaching.

Spun-dyed yarns are also particularly low-emission and enable consumption and water contamination to be reduced compared to standard wet-chemical dyeing.

Besides spun-dyed multifilament yarns, however, other processes are not categorically excluded in the context of the invention. Relatively good durability can also be achieved with package dyeing, that is by yarn packages prior to formation of the spacer fabric, or with dyeing of the spacer fabric at elevated temperatures, typically above 100° C.

The polymeric multifilament yarns of the first textile layer and of the spacer yarns and, preferably, the second textile layer as well preferably have a uniform color tone so as to form a uniform and harmonious surface in the manner described. Black, various shades of gray, brown, or beige can be provided as a color tone.

The above-described dark and/or reserved color tones result in an especially noble and harmonious design. As will readily be understood, the invention is not however limited to such embodiments. To wit, even with bright and eye-catching colors, an especially high-quality, uniform appearance is obtained when the multifilament yarns of the first textile layer, of the spacer yarns, and, preferably, of the textile layer as well are dyed in a uniform color.

Even if, according to one variant of the invention, not all of the multifilament yarns are dyed the same or exactly the same, the appearance can be precisely determined within the scope of the invention, thus avoiding undesired flaws. For example, two yarn systems with multifilament yarns that differ in terms of their shades of color can also be provided for the first textile layer that is provided as a visible surface. The multifilament yarns having a first color shade, on the one hand, and the multifilament yarns having a second color shade, on the other hand, can then be preferably associated with different guide bars, so that the textile character of the first textile layer stands out even more clearly as a result of the knitting process. The spacer yarns can then be adapted to the first color shade or to the second color shade so as not to have an objectionable appearance. Therefore, although the spacer yarns are present, the impression of a simple, essentially two-dimensional textile is produced.

According to another variant, individual multifilament yarns can be provided in a different color shade, preferably in a regular sequence, in order for example to produce a striped pattern. Even then, however, the spacer yarns should not emerge as separate components.

The invention specifies an improved interior trim part and the use of a spacer fabric in order to form an interior trim part, the general idea of the invention initially involving the surface design and the further advantages of a knitted spacer fabric.

According to another aspect, further special advantages can be achieved through the use of a knitted spacer fabric to form an interior trim part if the second textile layer comprises a first polymer component and a second polymer component, with only the first polymer component being at least partially fused during a shaping process with application of heat.

The definition of a first and a second polymer component does not refer to a mixture in the manner of a blend. Instead, the first polymer component and the second polymer component are arranged so as to be spatially separated from one another in the yarn structure of the second textile layer, resulting in various design options. For example, the second textile layer can have a first yarn system and a second yarn system that are then also typically associated with different guide bars or needles. The first yarn system is then made of the first polymer component that can in principle also be a blend. The second yarn system is then made of the second polymer component. In particular, the two yarn systems can also be processed with a different knitting pattern on the respective guide bars during production of the knitted spacer fabric.

According to an alternative embodiment, the second textile layer is formed by multifilament yarns, in which case the yarn of the multifilament yarn is made of different filament types. A first filament type is then made of the first polymer component and a second filament type by the second polymer component. According to another variant, bicomponent fibers can also be used for the second textile layer that then preferably have a core-shell structure. In such bicomponent fibers, the first polymer component and the second polymer component are then separated from one another in cross section. In the preferred core-shell structure, the first polymer component that melts upon introduction of heat, advantageously forms the shell.

In all of the described embodiments, the first polymer component and the second polymer component are therefore physically separated from one another, at least microscopically. When the first polymer component is fused at least partially, the second polymer component retains its structure, so that the corresponding yarns, the corresponding filaments (or cores in the case of bicomponent fibers) maintain the structure of the second textile layer.

On the other hand, the fusing of the first polymer component causes the corresponding yarns, filaments, or shells of bicomponent fibers to undergo a structural change, resulting in substantial stiffening after cooling. If the spacer fabric is shaped in three dimensions simultaneously with the temperature treatment, this stiffening as a result of the first polymer component also results in three-dimensional shaping.

In order to ensure that only the first polymer component is fused in the described manner, it is advantageous to provide a different melting or softening temperature for the two polymer components. The temperature difference in terms of softening and melting temperatures is usually at least 10 Kelvin, more preferably at least 20 Kelvin, it being readily possible for even greater temperature differences to be provided for the purpose of even easier process control.

The at least partial fusing of the first polymer component adapts the corresponding fibers or filaments to a predetermined shape. In particular, the yarns or filaments can also be connected to one another thermoplastically and glued together, as it were. Even if the yarns or fibers of the second polymer component are not fused, they can be enclosed and hence also fixed by the first polymer component, depending on the arrangement and method variant. In particular, it is possible for a relatively stiff, substantially lattice-like structure to be formed by fusing of the first polymer component, in which case the structural integrity of the second textile layer is then ensured by the second polymer component, as explained above.

The object of the invention is also an interior trim part, particularly a headliner of a passenger car, with a substrate and a first and a second textile layer as well as a spacer fabric having spacer yarns that join the textile layers, and the spacer fabric is arranged with the second textile layer on the substrate and the first textile layer forms a visible surface of the interior trim part so that the first textile layer and the spacer yarns are made entirely of polymeric multifilament yarns and at least the polymeric multifilament yarns of the first textile layer and of the spacer yarns are dyed.

With regard to the possible developments of the interior trim part according to the invention, reference is made to the explanations concerning the use according to the invention, it being possible for the features described there to be provided in like manner in the interior trim part.

For example, the substrate can be made of a thermoshaped laminate, in which case such a thermoshaping process can be performed with or without the applied spacer fabric, depending on the method variant.

In principle, however, other types of substrate can be considered. For example, the substrate can also be an injection-molded part. In that case, either the injection-molded part is first formed and the spacer fabric laminated, particularly glued, onto it, or the spacer fabric is back-injected, so that the use of adhesive can then be optionally avoided.

According to a development of the invention, the second textile layer has a first polymer component and a second polymer component, the second textile layer being stiffened and/or spatially shaped by a structural change of the first polymer component that is caused by fusion. The spacer fabric can thus also be "thermoshaped" in a certain sense.

It is known to bond a covering material, according to the invention the spacer fabric, with the substrate in a heated form in order to form an interior trim part. The first polymer material of the second textile layer can be selected such that only it melts at a predetermined temperature during the bonding process, and the restorative forces of the spacer fabric are reduced and an setting of the contour takes place. For certain applications, it is also conceivable in principle for shaping to be achieved without a separate substrate solely through the described stiffening of the second textile layer.

Finally, the invention also relates to a knitted spacer fabric that is particularly suitable for the use according to the invention and/or for the interior trim part according to the invention. The knitted spacer fabric has a first and a second textile layer as well as spacer yarns that join the textile layers and is characterized in that the two textile layers and the spacer yarns are made of a single yarn type in the form of a multifilament yarn, the two textile layers and the spacer yarns also being uniformly dyed. The knitted spacer fabric according to the invention can thus be made completely of a uniform starting material in the form of the multifilament yarn.

BRIEF DESCRIPTION OF THE DRAWING

The above and other objects, features, and advantages will become more readily apparent from the following description, reference being made to the accompanying drawing whose sole FIGURE is a sectional view of the trim part and spacer fabric of this invention.

SPECIFIC DESCRIPTION OF THE INVENTION

As seen in the drawing a headliner of a vehicle is formed by a rigid substrate 1 and a spacer fabric 3 that is bonded to the substrate 1 as a knitted spacer fabric by an adhesive 2. The substrate 1 is shaped three-dimensionally by thermoshaping, for example, and is curved in the illustrated section. It lies against or forms a roof of passenger compartment.

The spacer fabric 3 has a first flat textile layer 4, a second flat textile layer 5, and spacer yarns 6 that join the spacer layers 4 and 5. It can be seen here that the first textile layer 4 forms a visible surface of the headliner as interior trim.

In order to ensure an especially uniform appearance on the corresponding surface, in the context of the invention the first textile layer 4 and the spacer yarns 6 are made entirely of polymeric multifilament yarns.

In the illustrated embodiment, the entire spacer fabric 3 consists of a single yarn type in the form of a multifilament yarn having a fineness of 76 dtex, for example, and typically 24 or 36 filaments.

The thickness of the spacer fabric 3 is between 2 mm and 5 mm, for example about 3 mm.

The multifilament yarns are uniformly spun-dyed in a color tone selected from the group of black, gray, brown, and beige.

We claim:

1. Use of a spacer fabric that comprises a first and a second textile layer as well as spacer yarns that join the textile layers to form an interior trim, wherein
    the first textile layer is visible from outside on a surface of the interior trim,
    the first textile layer and the spacer yarns are made entirely of polymeric multifilament yarns, and
    at least the polymeric multifilament yarns of the first textile layer and of the spacer yarns are dyed.

2. The use defined in claim 1, wherein the entire spacer fabric is made entirely of multifilament yarns.

3. The use defined in claim 2, wherein the entire spacer fabric is made of a single yarn type for the multifilament yarns.

4. The use defined in claim 3, wherein the multifilament yarns of the first textile layer and of the spacer yarns have a fineness of between 50 and 167 dtex.

5. The use defined in claim 3, wherein the multifilament yarns of the first textile layer and of the spacer yarns each have 12 to 50 filaments.

6. The use defined in claim 1, wherein the multifilament yarns of the first textile layer and of the spacer yarns are spun-dyed.

7. The use defined in claim 1, wherein polymeric filaments of the yarns of the first textile layer and spacer filaments are uniformly dyed black, gray, brown, or beige.

8. The use defined in claim 1, wherein the spacer fabric is knitted.

9. The use defined in claim 8, wherein the spacer fabric has a thickness between 1.5 mm and 10 mm.

10. The use defined in claim 1, wherein the second textile layer comprises a first polymer component and a second polymer component and only the first polymer component is at least partially fused during a thermal shaping process.

11. An interior trim part comprising:
    a substrate;
    a spacer fabric a first and second textile layers and having spacer yarns that join the textile layers, wherein
    the spacer fabric is oriented with the second textile layer on the substrate and the first textile layer forms a visible surface,
    the first textile layer and the spacer yarns are made entirely of polymeric multifilament yarns, and
    at least the polymeric multifilament yarns of the first textile layer and of the spacer yarns are dyed.

12. The trim part defined in claim 11, wherein the substrate is a thermoshaped laminate.

13. The trim part defined in claim 11, wherein the second textile layer has a first polymer component and a second polymer component, the second textile layer being stiffened or spatially shaped by a structural change of the first polymer component that is caused by fusion.

14. A knitted spacer fabric comprising:
    a first layer;
    a second textile layer generally parallel to the first layer; and
    spacer yarns extending between and joining the first and second layers, the multifilament yarns of the first and second layers and the spacer yarns all the same with respect to composition, yarn type, and color.

* * * * *